United States Patent [19]

Kubota et al.

[11] Patent Number: 4,629,876

[45] Date of Patent: Dec. 16, 1986

[54] BAR CODE READER

[75] Inventors: Kazufumi Kubota; Seiichi Yamazaki; Yoshiyuki Monma, all of Kanagawa, Japan

[73] Assignee: Fuji Photo Film Co., Ltd., Kanagawa, Japan

[21] Appl. No.: 680,020

[22] Filed: Dec. 10, 1984

[30] Foreign Application Priority Data

Feb. 27, 1984 [JP] Japan ................................ 59-035644

[51] Int. Cl.[4] .............................................. G06K 7/10
[52] U.S. Cl. ..................................... 235/473; 235/462
[58] Field of Search ................................ 235/462, 473

[56] References Cited

U.S. PATENT DOCUMENTS 3,886,328  5/1975  Narms ................................. 235/473

Primary Examiner—Harold I. Pitts
Attorney, Agent, or Firm—Sughrue, Mion, Zinn, Macpeak & Seas

[57] ABSTRACT

A photographic film having a bar code formed in the vicinity of one side edge thereof is longitudinally moved while being guided by a mount. An optical fiber bundle which moves while following one widthwise end surface of the photographic film reads the bar code on the film. The optical fiber bundle follows any change in width of the photographic film and therefore constantly coincides with the bar code to effect correct reading thereof.

22 Claims, 7 Drawing Figures

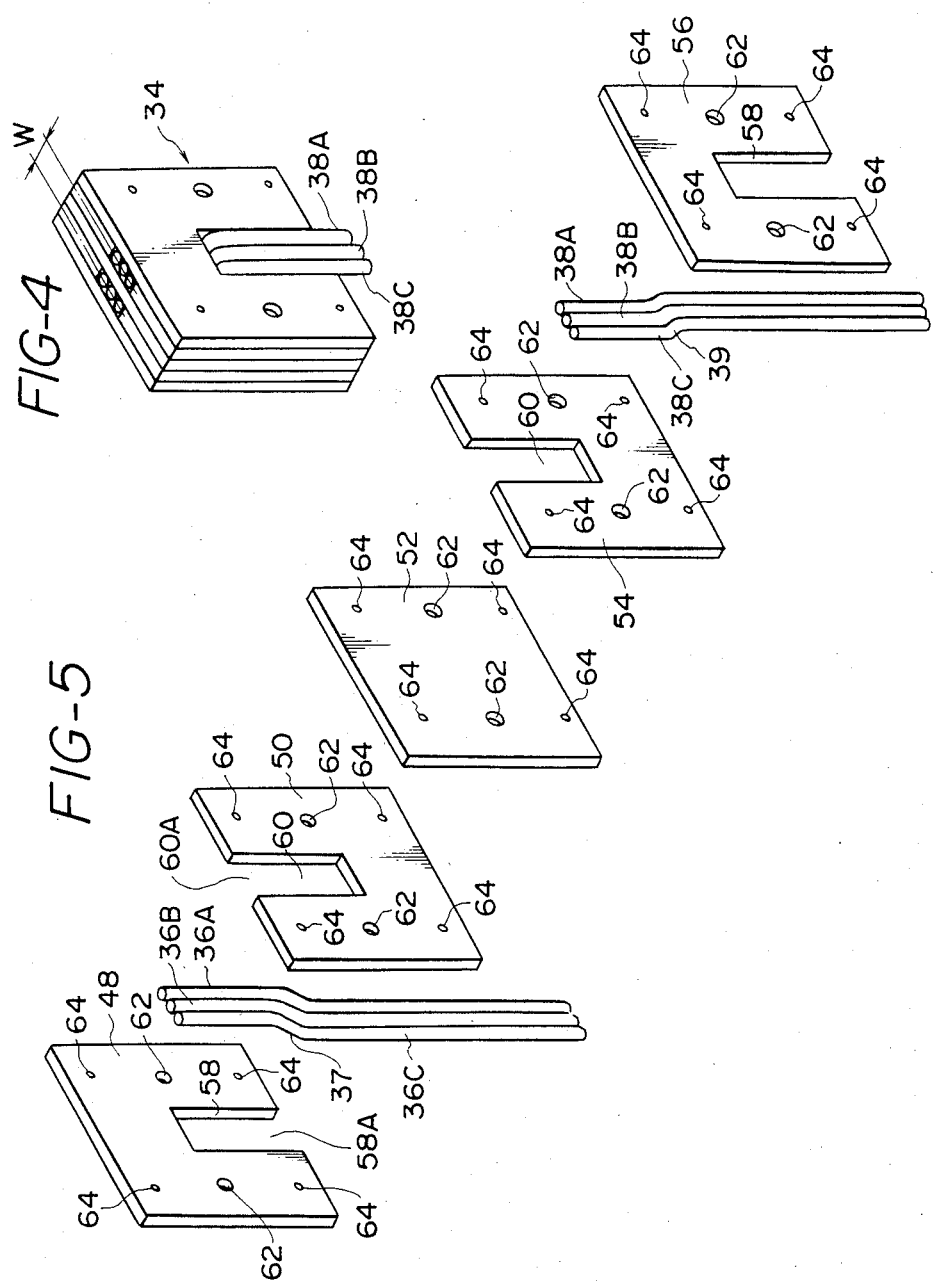

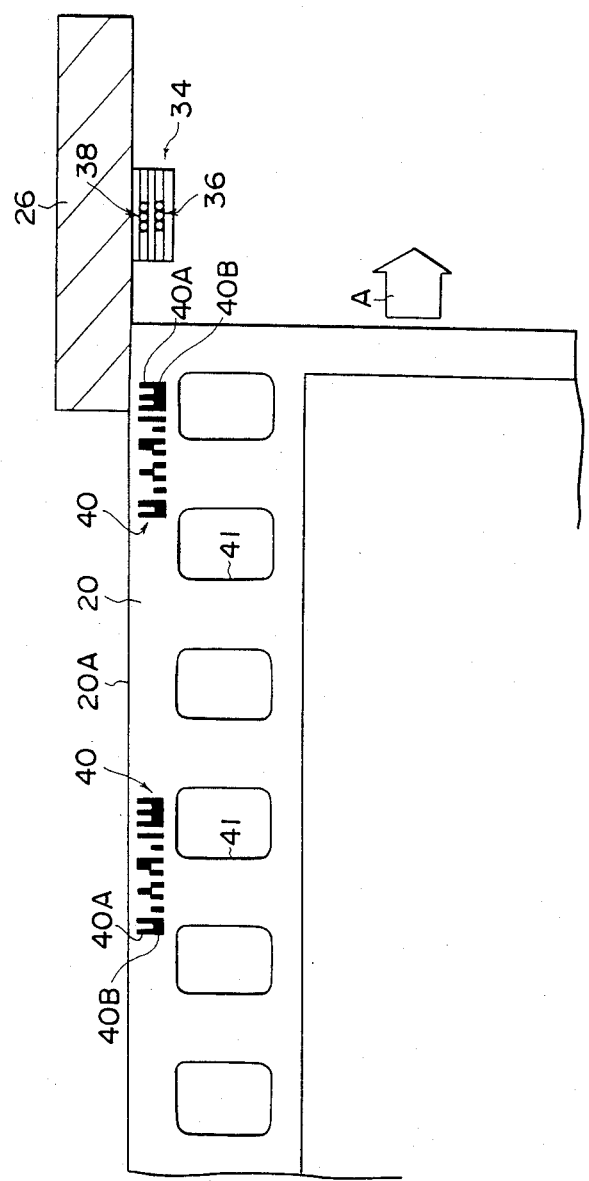

BAR CODE READER

BACKGROUND OF THE INVENTION

1. Field of the Invention:

The present invention relates to a bar code reader for reading a bar code formed on an object subjected to detection of information, such as a photographic film.

2. Description of the Prior Art:

Provision of a bar-code forming area on a portion of a photographic film makes it possible to record information, such as exposure correction data, which is used when the film is printed.

It is, however, not easy to read the bar code since it is generally formed on a narrow area between one side edge of the film and one of the sprocket-engaging perforations which are formed on both sides of the series of images on the film.

More specifically, the bar code formed on the photographic film is constituted by two rows of bars respectively serving as a clock track and a data track. The width of each track is about 1 mm, and the minimum distance between adjacent bars is about 0.45 mm in the film advancing direction. The position of the bar code is standardized on the basis of the distance between the bar code and the side edge of the film on which the bar code is formed. Optical fibers for reading the bar code are required to be precisely positioned such as to be coincident with each of the tracks. If the optical fibers are positioned on the basis of the side edge of the film which is opposite to the side on which the bar code is formed, any change in width of the film undesirably causes the position of the bar-code forming area to vary correspondingly, which can easily lead to a read error.

SUMMARY OF THE INVENTION

In view of the above-described fact, a primary object of the present invention is to provide a bar code reader capable of correctly reading a bar code formed on a photographic film by precisely positioning optical fibers such that they are coincident with tracks of the bar code even when the width of the film changes.

To this end, according to the invention, there is provided a bar code reader in which a sensor head is disposed such as to abut against one side end surface of an object subjected to detection of information moving in the longitudinal direction thereof so as to follow any change in the position of the side end surface of the object, and optical fibers secured to the sensor head are allowed to oppose a bar code formed on the object, whereby the optical fibers are precisely positioned such as to be coincident with the bar code tracks in order to be able to detect the light and dark portions of the bar code.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 4 is a perspective view of a sensor head in accordance with the first embodiment shown in FIG. 1 (in an inverted state);

FIG. 5 is an exploded perspective view of the sensor head shown in FIG. 4;

FIG. 6 is a sectional view showing the correspondence between a bar code formed on a photographic film and the sensor head (a mount is not shown)

DESCRIPTION OF THE PREFERRED EMBODIMENTS

Figure 1:
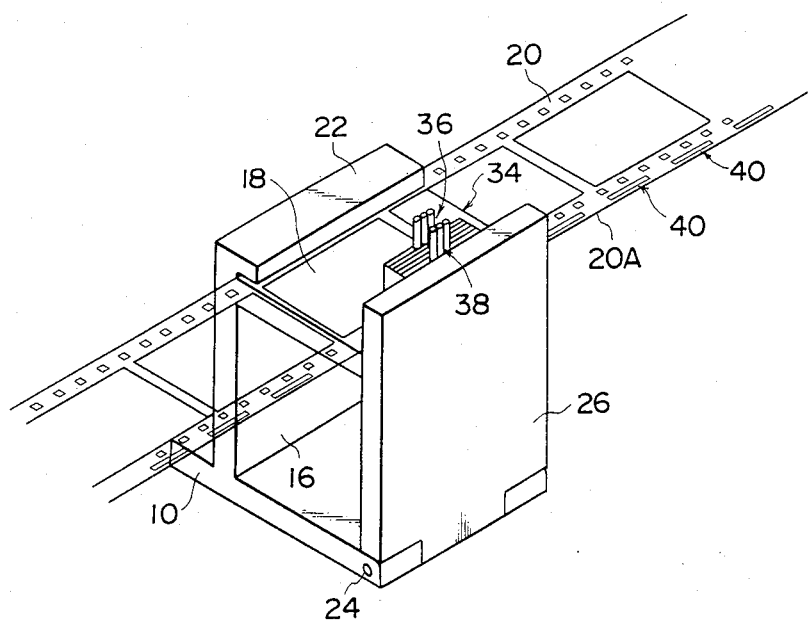
FIG. 1 is a perspective view of a first embodiment of a bar code reader in accordance with the present invention.
Figure 2:
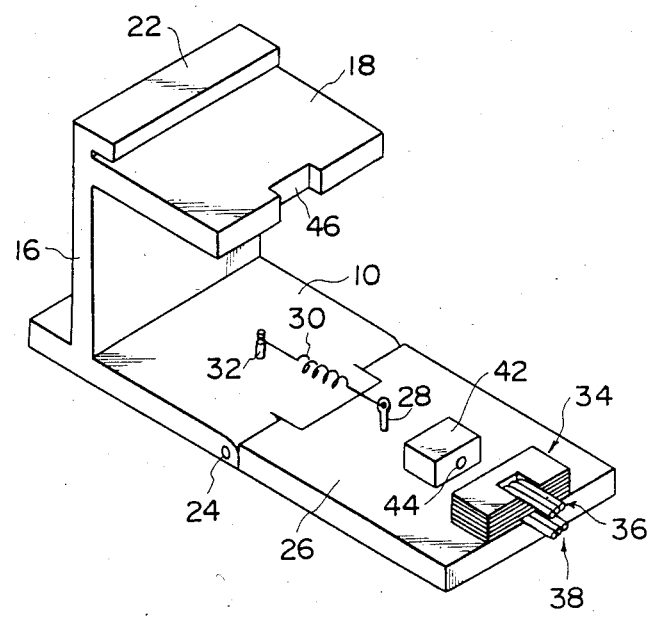
FIG. 2 is an illustration showing the operation of the bar code reader shown in FIG. 1 in a state wherein a movable plate thereof is pivoted.
Figure 3:
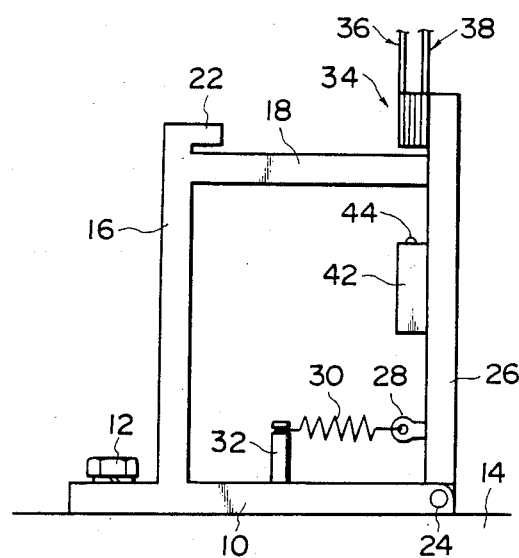
FIG. 3 is a side elevational view of the bar code reader shown in FIG. 1.

FIGS. 1 to 3 in combination show a bar code reader for a photographic film in accordance with a first embodiment of the present invention.

The bar code reader has a base plate 10 secured to a base 14 by means of bolts 12. A vertical wall 16 is provided on the base plate 10. A mount 18 horizontally projects from a portion of the wall 16 near the upper end thereof. The mount 18 is, as shown in FIG. 1, arranged such that a photographic film 20 moves longitudinally while sliding on the mount 18.

A substantially L-shaped presser plate 22 projects from the joint between the mount 18 and the wall 16 such as to oppose one of the side portions of the photographic film 20 in order to prevent the film 20 from lifting.

A movable plate 26 is pivotally supported at one of the ends thereof by a pin 24 at the distal end of the base plate 10. A spring retainer pin 28 projecting upwardly from the surface of the movable plate 26 retains one of the ends of a tension coiled spring 30. The other end of the tension coiled spring 30 is retained by a spring retainer pin 32 projecting upwardly from the surface of the base plate 10. Accordingly, the movable plate 26 is biased by the biasing force of the tension coiled spring 30 such as to pivot counterclockwise as viewed in FIG. 3. The movable plate 26 is allowed by this biasing force to abut against the side end surface 20A of the photographic film 20 opposite to the presser plate 22. The movable plate 26 further opposes the distal end surface of the mount 18 so as to be prevented from pivoting more than a predetermined angle. It is to be noted that the dimension of the mount 18 is set such that the side end surface 20A of the photographic film 20 constantly projects slightly beyond the distal end of the mount 18 so as to be able to abut against the movable plate 26.

A sensor head 34 is secured to a portion of the movable plate 26 near the upper end thereof by means of bonding, for example, such that a bundle of optical fibers 36 (36A, 36B, 36C) and a bundle of optical fibers 38 (38A, 38B, 38C) oppose bar codes 40 (see FIG. 6) formed in the vicinity of the side end surface 20A of the photographic film 20. The bar codes 40 are formed within a narrow area between the side end surface 20A of the photographic film 20 and a film-feeding perforation 41 formed therein, at predetermined spacings in the longitudinal direction of the film 20. Each of the bar codes 40 has a data track 40A and a clock track 40B.

Further, a light source 42 is secured to the movable plate 26. The arrangement is such that the light projected from a lens 44 is applied to the photographic film 20 through a window 46 formed in the mount 18, whereby the light and dark portions of each bar code 40 are detected by means of the optical fibers.

The structure of the sensor head 34 and the optical fibers will be described hereinunder in detail. As shown in FIGS. 4 and 5, the sensor head 34 has flat plates 48, 50, 52, 54, 56. Although these flat plates have the same wall thickness in this embodiment, the wall thickness of each of the flat plates may be changed according to need.

The flat plate 48 is formed with a rectangular notch 58 which extends from a portion of a peripheral edge to a central portion of the plate 48 such as to serve as a recess for receiving the optical fibers 36A, 36B, 36C. The flat plate 50 is also formed with a similar notch 60. This notch 60 is, however, disposed such that an opening 58A of the notch 58 and an opening 60A of the notch 60 are opposite to each other, as shown in FIG. 5, when the flat plates 48 and 50 are joined together in layers. By virtue of this arrangement, the notches 58, 60 respectively define optical fiber receiving recesses communicated with each other near the central portion of the joined plates 48, 50, whereby the optical fiber bundle 36 is disposed in these receiving recesses while having a bent portion 37 formed at an intermediate portion thereof.

Similar notches 58, 60 are respectively formed in the flat plates 54, 56 such as to define in combination a continuous optical fiber receiving recess bent at a central portion thereof. Thus, the optical fiber bundle 38 is similarly disposed in the optical fiber receiving recess while having a bent portion 39 formed at an intermediate portion thereof. Each of the flat plates 48, 50, 54, 56 has a wall thickness substantially equal to the diameter of each optical fiber, and each of the notches 58, 60 has a width substantially equal to a value three times as large as the diameter of each optical fiber, thereby allowing each optical fiber bundle to tightly fit in the corresponding optical fiber receiving recess.

Unlike the other flat plates, the flat plate 52 is not provided with any notch but allows the outer peripheral portion of each of the optical fibers disposed within each notch 60 to abut against it. Accordingly, the wall thickness of the flat plate 52 determines the distance W between the respective axes of the optical fiber bundles 36, 38 (see FIG. 4).

These flat plates 48 to 56 are formed with positioning bores 62 and adhesive filling bores 64 which have respective axes perpendicular to the corresponding plate surfaces and are respectively communicated with each other when the plates 48 to 56 are joined together in layers.

The sensor head 34 is assembled according to the following procedure. First of all, the optical fiber bundle 36 is disposed in the notches 58, 60 of the flat plates 48, 50, while the optical fiber bundle 38 is disposed in the notches 58, 60 of the flat plates 54, 56. Positioning pins, not shown, are respectively inserted into the positioning bores 62 of the flat plates 48 to 56 such as to join together the plates 48 to 56 in layers. Then, an adhesive is injected into the adhesive filling bores 64. Further, another adhesive is injected into the gap between the optical fibers and the bottom surface of each of the recesses defined by the notches 58, 60. After the adhesives have hardened, the positioning pins are removed from the positioning bores 62, whereby the sensor head 34 is completed, as shown in FIG. 4. In this sensor head 34, the distance W between the respective axes of the optical fiber bundles 36, 38 is precisely maintained.

The sensor head 34 is secured to the movable plate 26 by an adhesive or other bonding means, and the distal end portions of the optical fibers are disposed such as to oppose the upper surface of the mount 18 as shown in FIGS. 1, 3, thus completing the assembly of the sensor head 34.

The photographic film 20 is placed on the mount 18 and is moved longitudinally (in the direction of the arrow A in FIG. 6). In addition, the light source 42 is energized, and the light projected from the lens 44 is applied to the photographic film 20 through the window 46. Thus, it is possible to read the light and dark portions of each bar code 40 by means of the optical fiber bundles 36, 38.

Since the optical fiber bundles 36, 38 are secured such that the distance W between the axes thereof is precisely maintained, the optical fiber bundles 38, 36 can be precisely positioned such as to be coincident with the data track 40A and the clock track 40B, respectively, of each bar code 40 as shown in FIG. 6.

Even when there is a change in width of the passing photographic film 20, since the movable plate 26 is allowed to abut against the side end surface 20A of the film 20 by the biasing force of the tension coiled spring 30, the sensor head 34 moves while following the side end surface 20A of the film 20, whereby the optical fiber bundles 38, 36 are precisely positioned such as to be coincident with the data track 40A and the clock track 40B, respectively, thereby enabling reading of each bar code 40 without any error.

It is to be noted that the sensor head 34 in accordance with this embodiment may be arranged such that the flat plates 50, 52, 54 are integrally formed beforehand, and then the notches 60 are formed in the integral plate member.

Figure 7:
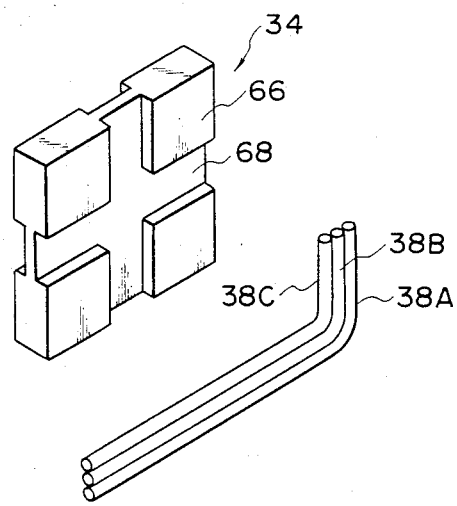
FIG. 7 is an exploded perspective view of a sensor head in accordance with a second embodiment of the present invention.

Referring next to FIG. 7, there is shown a sensor head 34 in accordance with a second embodiment of the present invention. Unlike the sensor head 34 of the first embodiment, the sensor head 34 in accordance with the second embodiment is constituted by a single flat plate 66 having a wall thickness equivalent to the entire wall thickness of the joined flat plates 50, 52, 54 in the first embodiment. The flat plate 66 is formed on each of the surfaces thereof with a cross-shaped notch 68 extending crosswise from the center to a central portion of each peripheral side of the plate 66. The notch 68 defines an optical fiber receiving recess. By virtue of the shape of this recess, it is possible to draw out an optical fiber bundle with its intermediate portion bent at a right angle as shown in FIG. 7, and it is also possible to draw out linearly the optical fiber bundle, which advantageously increases the degree of freedom when mounting the optical fiber bundle.

In this embodiment also, the wall thickness of the portion of the flat plate 66 which remains between the recesses on both surfaces thereof serves to precisely maintain the distance between the respective axes of the optical fiber bundles received in the recesses on both surfaces of the flat plate 66.

It is to be noted that, in each of the above-described embodiments, flat plates may be further disposed such as to respectively abut against both sides of the sensor head 34 in order to externally cover the optical fiber bundles.

Further, the present invention advantageously facilitates maintenance of the sensor head and the light-projecting system.

What is claimed is:

1. A bar code reader for reading a bar code formed on a portion of a moving object subjected to detection of information near one side end surface thereof, comprising:
   (a) a movable member abutting against said side end surface of said moving object so as to follow any change in position of said side end surface of said object;
   (b) a sensor head secured to said movable member so as to move with said movable member; and
   (c) a bundle of optical fibers secured to said sensor head such as to oppose said bar code on said object in order to read said bar code,
   whereby said optical fiber bundle follows any movement of the position of said bar code caused by a change in position of said side end surface of said object, thereby allowing correct reading of said bar code.

2. A bar code reader according to claim 1, wherein said movable member is allowed to abut against said side end surface of said object by a biasing force, thereby allowing said optical fiber bundle to follow said side end surface of said object.

3. A bar code reader according to claim 1, wherein said movable member is pivotally supported by a base member such as to pivotally move while following a change in position of said side end surface of said object.

4. A bar code reader according to claim 3, wherein said base member is provided with a mount which serves to mount and guide said object, and said movable member is biased toward one of the end surfaces of said mount.

5. A bar code reader according to claim 4, wherein said mount is formed such that said side end surface of said object projects beyond said end surface of said mount so as to allow said movable member to abut against said side end surface of said object.

6. A bar code reader according to claim 4, wherein said mount is formed at said end surface with a window for applying the light from a light source to the reverse surface of said object.

7. A bar code reader according to claim 6, wherein said light source is secured to said movable member.

8. A bar code reader according to claim 4, wherein said mount is provided at the other end thereof with a presser plate for preventing said object from lifting.

9. A bar code reader according to claim 1, wherein said sensor head has a plurality of plate members joined together in layers, and said optical fiber bundle is received in a notch formed in any one of said plate members.

10. A bar code reader according to claim 1, wherein said sensor head has a pair of optical fiber bundles respectively abutting against the opposite side surfaces of a plate member such that the distance between the respective axes of these optical fiber bundles is precisely maintained.

11. A bar code reader according to claim 1, wherein said sensor head has a pair of plate members joined together in layers, and notches are formed in said plate members from opposite directions such as to communicate with each other at a portion thereof, thereby defining a recess for receiving said optical fiber bundle which is bent at an intermediate portion thereof.

12. A bar code reader according to claim 1, wherein said sensor head has first and second bundles of optical fibers secured thereto, each of the optical fiber bundles being bent at an intermediate portion thereof by being retained between a pair of plate members respectively having notches which are formed therein from opposite directions such as to communicate with each other at a portion thereof, thereby defining a bent optical fiber receiving recess, whereby it is possible to dispose said optical fiber bundles with their respective distal end portions positioned close to each other.

13. A bar code reader according to claim 1, wherein said sensor head has a plate member formed with grooves intersecting each other such that said optical fiber bundle is received in these grooves, thereby allowing said optical fiber bundle to be disposed while being bent at the intersection between said grooves.

14. A bar code reader for reading a bar code formed on a portion of a photographic film near one side end surface thereof, comprising:
   (a) a base plate;
   (b) a mount secured to said base plate so as to mount said photographic film thereon;
   (c) a movable member pivotally supported by said base plate and biased toward one of the end surfaces of said mount;
   (d) a sensor head secured to said movable member so as to move with said movable member; and
   (e) an optical fiber bundle for reading said bar code secured to said sensor head such as to oppose said bar code on said photographic film.

15. A bar code reader according to claim 14, wherein said mount is formed such that one widthwise end surface of said photographic film projects slightly beyond said end surface of said mount so as to allow said movable member to abut against said widthwise end surface of said photographic film.

16. A bar code reader according to claim 14, wherein said mount is formed at said end surface thereof with a window for applying the light from a light source to the reverse surface of said photographic film.

17. A bar code reader according to claim 14, wherein said mount is provided with a presser plate for preventing lifting of the widthwise end surface of said photographic film opposite to said optical fiber bundle.

18. A bar code reader according to claim 14, wherein said sensor head has a pair of optical fiber bundles respectively abutting against the opposite side surfaces of a plate member such that the distance between the respective axes of these optical fiber bundles is precisely maintained.

19. A bar code reader according to claim 14, wherein said sensor head has first and second bundles of optical fibers secured thereto, each of the optical fiber bundles being bent at an intermediate portion thereof by being retained between a pair of plate members respectively having notches which are formed therein from opposite directions such as to communicate with each other at a portion thereof, thereby defining a bent optical fiber receiving recess, whereby it is possible to dispose said optical fiber bundles with their respective distal end portions positioned close to each other.

20. A bar code reader for reading a bar code formed between one side end surface of a photographic film and a sprocket-engaging perforation formed therein, the bar code being constituted by two rows of bars respectively serving as a clock track and a data track, said bar code reader comprising:

(a) a base plate secured to a base;

(b) a mount secured to said base plate so as to guide the moving photographic film, said mount being formed such that one of the widthwise end surfaces of said film projects slightly beyond the distal end of said mount;

(c) a movable member pivotally supported by said base plate such as to be able to come in and out of contact with the distal end of said mount; and (d) a sensor assembly secured to said movable member, said assembly having a sensor head and a pair of optical fiber bundles secured thereto, said sensor head further having a central space-setting plate and first and second guide means which are respectively secured to both sides of said space-setting plate, said guide means being closely contacted by each other and respectively having grooves which are formed therein from opposite directions such as to communicate with each other at a portion thereof, and said grooves respectively receiving said optical fiber bundles such that each of said optical fiber bundles is bent at an intermediate portion thereof and abuts at its distal end against said space-setting plate, whereby the distance between the respective axes of said optical fiber bundles is precisely maintained.

21. A bar code reader according to claim 20, wherein a window for passing the light applied to said photographic film is formed between said mount and said movable member.

22. A bar code reader according to claim 21, wherein said mount is provided at the other end thereof with a presser plate for preventing said photographic film from lifting.

* * * * *